(12) United States Patent
Red et al.

(10) Patent No.: US 6,895,299 B2
(45) Date of Patent: May 17, 2005

(54) SYSTEMS AND METHODS FOR REPRESENTING COMPLEX N-CURVES FOR DIRECT CONTROL OF TOOL MOTION

(75) Inventors: Walter E. Red, Provo, UT (US); Robert M. Cheatham, Provo, UT (US); C. Gregory Jensen, Provo, UT (US)

(73) Assignee: Brigham Young University, Provo, UT (US)

( * ) Notice: Subject to any disclaimer, the term of this patent is extended or adjusted under 35 U.S.C. 154(b) by 73 days.

(21) Appl. No.: 10/272,537

(22) Filed: Oct. 15, 2002

(65) Prior Publication Data

US 2004/0019394 A1 Jan. 29, 2004

Related U.S. Application Data

(60) Provisional application No. 60/330,003, filed on Oct. 16, 2001.

(51) Int. Cl.[7] ............................................. G06F 19/00
(52) U.S. Cl. ..................... 700/186; 700/182; 700/184; 700/188; 700/194
(58) Field of Search ............................... 700/182, 184, 700/188, 192

(56) References Cited

U.S. PATENT DOCUMENTS

| | | | | |
|---|---|---|---|---|
| 4,396,976 A | * | 8/1983 | Hyatt | 700/1 |
| 4,607,325 A | * | 8/1986 | Horn | 700/31 |
| 4,831,549 A | * | 5/1989 | Red et al. | 700/254 |
| 5,171,417 A | * | 12/1992 | DiFranco et al. | 205/77 |
| 5,197,013 A | * | 3/1993 | Dundorf | 700/182 |
| 5,450,205 A | * | 9/1995 | Sawin et al. | 356/632 |
| 5,486,995 A | * | 1/1996 | Krist et al. | 700/29 |
| 5,587,091 A | * | 12/1996 | Kawagoe et al. | 219/110 |
| 5,752,008 A | * | 5/1998 | Bowling | 703/13 |

OTHER PUBLICATIONS

Fleisig, R.V., et al., "A Constant Fee and Reduced Angular Acceleration Interpolation Algorithm for Multi–Axis Maching", Computer–Aided Design 33 (2001) pp. 1–15.

Kang, I.G., et al., "Cubic Spline Algorithms for Orientation Interpolation", Int. J. Numer. Meth. Engng. 46, pp. 45–64 (1999).

Xia, J., et al., "An Exact Representation of Effective Cutting Shapes of 5–Axis CNC Machining Using Rational Bezier and B–Spline Tool Motions", Proceedings of the 2001 IEEE International Conference on Robotics & Automation Seoul, Korea—May 21–26, 2001.

Xia, J., et al., "On the Exact Representation of the Boundary Surfaces of the Swept Volume of a Cylinder Undergoing Rational Bezier and B–Spline Motions", Journal of Mechanical Design Jun. 2001, vol. 123 pp. 261–265.

* cited by examiner

Primary Examiner—Leo Picard
Assistant Examiner—Michael D. Masinick
(74) Attorney, Agent, or Firm—Madson & Metcalf

(57) ABSTRACT

A method for controlling a mechanism through the use of higher-dimensional n-curves is disclosed. An electronically-controlled mechanism is provided. Electronic communication is established between a computer and the electronically-controlled mechanism. A controller is running or executing on the computer to send mechanism commands to the electronically-controlled mechanism. Process control software is used to control the electronically-controlled mechanism. The process control software uses higher-dimensional n-curves to control the electronically-controlled mechanism.

60 Claims, 9 Drawing Sheets

SYSTEMS AND METHODS FOR REPRESENTING COMPLEX N-CURVES FOR DIRECT CONTROL OF TOOL MOTION

RELATED APPLICATIONS

This application is related to and claims priority from U.S. patent application Ser. No. 60/330,003 filed Oct. 16, 2001, for "Direct control of tool motion by using a method for representing complex curves," with inventors Walter E. Red, Robert M. Cheatham and C. Gregory Jensen, which is incorporated herein by reference.

BACKGROUND OF THE INVENTION

1. Field of the Invention

The present invention relates generally to the field of computer-aided design (CAD) and computer-aided manufacturing (CAM). More specifically, the present invention relates to systems and methods for representing complex n-curves for direct control of tool motion.

2. Description of Related Background Art

Mechanical computer-aided design (CAD) and computer-aided manufacturing (CAM) systems have been in existence for many years. Initially, CAD/CAM systems were used for creating detailed designs of mechanical parts and for documenting designs using annotations such as dimensions and notes. CAD/CAM systems gradually expanded to other applications such as analysis and manufacturing. As parts are designed with CAD/CAM systems, the system creates computer models of the parts. Once a part has been designed on a CAD/CAM system, tool paths can be created to automate machining of the part. Tool paths control the operation of the machine tool as the tool cuts the part from the raw stock. A CAD system is used to create, document and analyze part models, while a CAM system is used to generate tool paths generated from the design model.

CAD/CAM systems have been extensively applied in the manufacturing industry. CAD technology is typically used to design one or more parts of a manufactured article. In the manufacturing process, automated mechanisms (e.g., robotic equipment) are then used to weld, paint, gauge and assemble the parts into a manufactured article. For instance, a part may be painted using a paint gun that is moved along the surface of the part by a tool or robot. Similarly, a part may be inspected for defects using a non-contact gauging sensor that is moved along the surface of the part by a robot. In either instance, CAM technology may be used to guide the motions of the robotic equipment.

As CAD/CAM systems are used to perform more complex tasks, it becomes increasingly difficult to effectively and efficiently control the mechanisms or tools. Thus, it would be beneficial if means were provided to enable efficient and effective ways to provide control of the mechanisms and/or tools used in CAD/CAM systems.

BRIEF DESCRIPTION OF THE DRAWINGS

Non-exhaustive embodiments of the invention are described with reference to the figures, in which.

DETAILED DESCRIPTION

Figure 1:
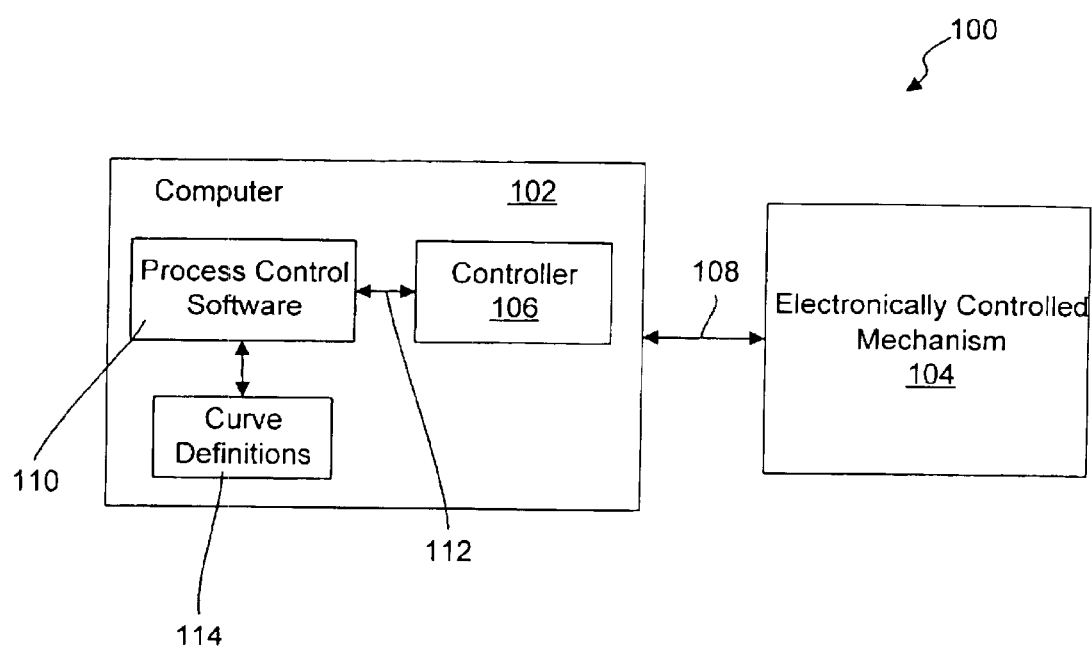
FIG. 1 is a block diagram of a system for controlling tool motion through the use of complex n-curves.

A method for controlling a mechanism through the use of higher-dimensional n-curves is disclosed. An electronically-controlled mechanism is provided. Electronic communication is established between a computer and the electronically-controlled mechanism. A controller is running or executing on the computer to send mechanism commands to the electronically-controlled mechanism. Process control software is used to pass control commands to the controller. The process control software and controller use higher-dimensional n-curves to control the electronically-controlled mechanism.

The higher-dimensional n-curve may describe a variety of different items. For example, the n-curve may describe, but is not limited to, mechanism position, mechanism orientation, welding voltage, glue rate, laser intensity, focal length, spindle speed, feed rate, Cartesian motion, orientation motion, speed, etc. The higher-dimensional n-curve may include subdivision, B-spline, non-uniform rational B-spline and Bezier mathematics.

The electronically-controlled mechanism may be embodied in a wide variety of different devices. For example, the electronically-controlled mechanism may be a machine tool or a robot.

A method for direct control of a mechanism through the use of higher-dimensional n-curves is also disclosed. An electronically-controlled mechanism is provided. Electronic communication is established between a computer and the electronically-controlled mechanism. A controller is running or executing on the computer to send mechanism commands to the electronically-controlled mechanism. Process control software is used to control directly the electronically-controlled mechanism without need for post-processing into intermediate programming languages or files such as APT, CL, or M&G code (defined by the EIA RS-274-D standard and subsequent revisions). The process control software uses higher-dimensional n-curves to control the electronically-controlled mechanism. The process control software also generates commands that are directly usable by the controller.

The process control software may be configured differently, depending on the context of use. In one embodiment the process control software uses one complex n-curve. In another embodiment the process control software uses any combination of complex n-curves.

A system for controlling a mechanism through the use of higher-dimensional n-curves is disclosed. The system includes an electronically controlled mechanism in electronic communication with a computer. The computer includes one or more processors, memory in electronic communication with the processor(s) and process control software. The process control software is used to pass control commands to the controller, which then electronically controls the mechanism. The process control software uses higher-dimensional n-curves to control the electronically-controlled mechanism.

A system for direct control of a mechanism through the use of higher-dimensional n-curves is also disclosed. The system includes an electronically controlled mechanism in electronic communication with a computer. The computer includes one or more processor(s), memory in electronic communication with the processor(s) and process control software. The process control software is used to pass control commands to the controller, which then electronically controls the mechanism. The process control software and controller use higher-dimensional n-curves to control the electronically-controlled mechanism. The process control software generates commands that are directly usable by the controller.

FIG. 1 is a block diagram of the system 100 for controlling tool motion through the use of complex n-curves. The system includes a computer 102 in electronic communication with an electronically-controlled mechanism 104, which may be a tool, a robot, a sensor, etc. It will be appreciated by those skilled in the art that additional computers may be used wherein the processes and functions disclosed below are distributed across multiple computer systems. A software controller 106 controls the electronically-controlled mechanism 104 through mechanism commands 108 sent to the mechanism 104. Process control software 110 provides commands 112 to the software controller 106 from which the software controller 106 determines mechanism commands 108 to send to the mechanism 104.

The process control software 110 may be any kind of software providing process control which may include, but is not limited to, Computer-Aided Manufacturing (CAM) software, robotics simulation application software, coordinate measuring machine (CMM) software, and factory control and scheduling software.

The process control software 110 uses one or more curve definitions 114 for controlling the electronically controlled mechanism 104 through the controller 106. The curve definitions 114 may define any number of parameters relating to the electronically controlled mechanism 104 including, but not limited to, surface geometries, curve geometries, and mechanism motion and control parameters.

In the systems disclosed herein, the curve definitions 114 may be described by subdivision, B-spline, Non-Uniform Rational B-Spline (NURBS) and Bezier mathematics. More generally, the curve definitions 114 may be described by all algebraic, polynomial and parametric curve and surface formulations. The term n-curve is used herein to represent any general algebraic, polynomial or parametric curve or surface that has been constructed in such a way as to combine position and/or pose and/or process parameters into a single or multiple curve expression.

Figure 2:
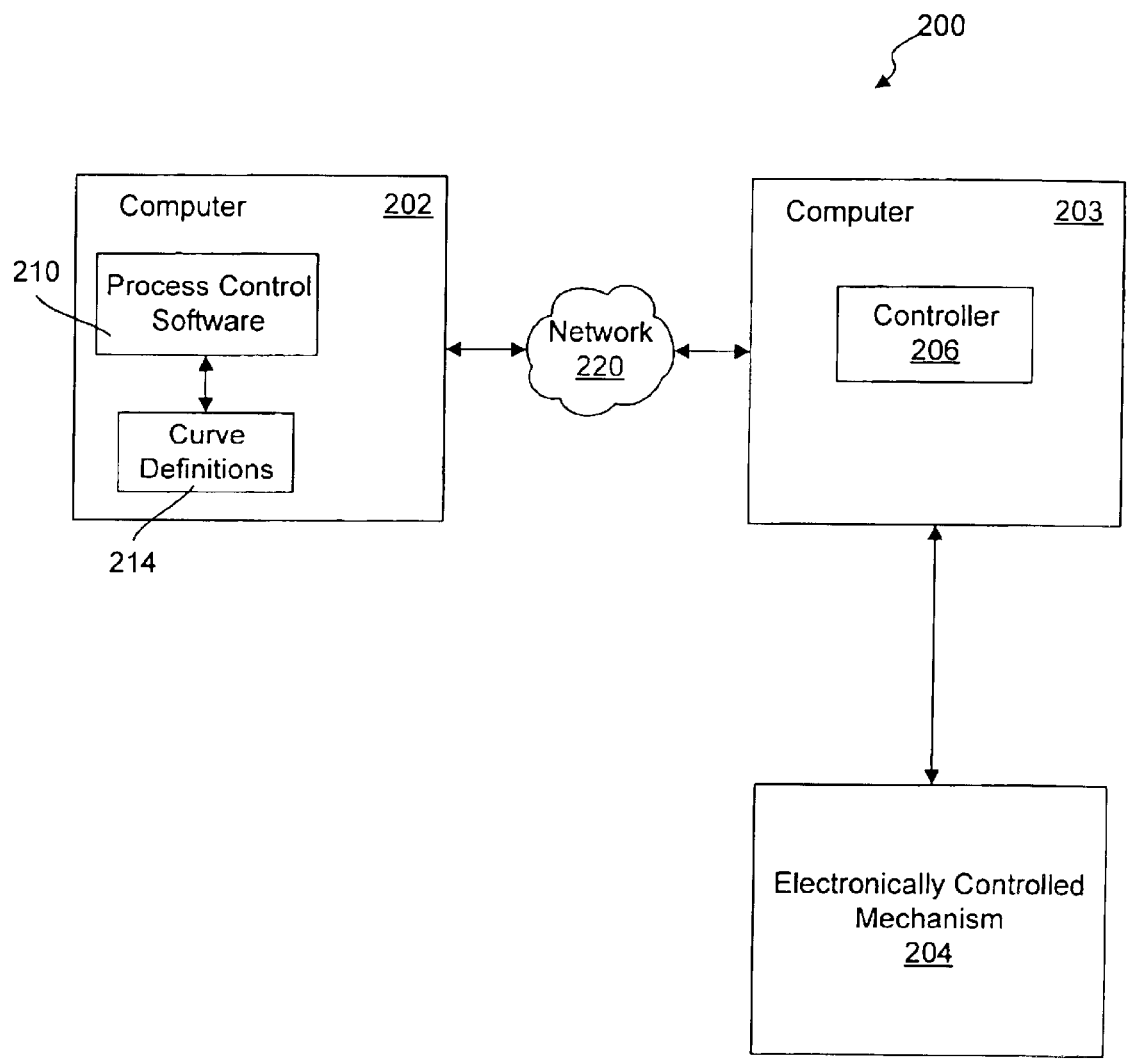
FIG. 2 is a block diagram of another system for controlling tool motion through the use of complex n-curves.

FIG. 2 illustrates a system 200 that is an alternative embodiment for the system 100 shown in FIG. 1. In FIG. 2 the process control software 210 and the controller 206 are located on different computer systems 202, 203 in electronic communication with one another via a computer network 220. The computer system 203 with the software controller 206 is in electronic communication with the mechanism 204. The process control computer system 202 and the software controller computer system 203 may communicate with one another through many different kinds of computer networking technologies, as will be appreciated by those skilled in the art.

Figure 3:
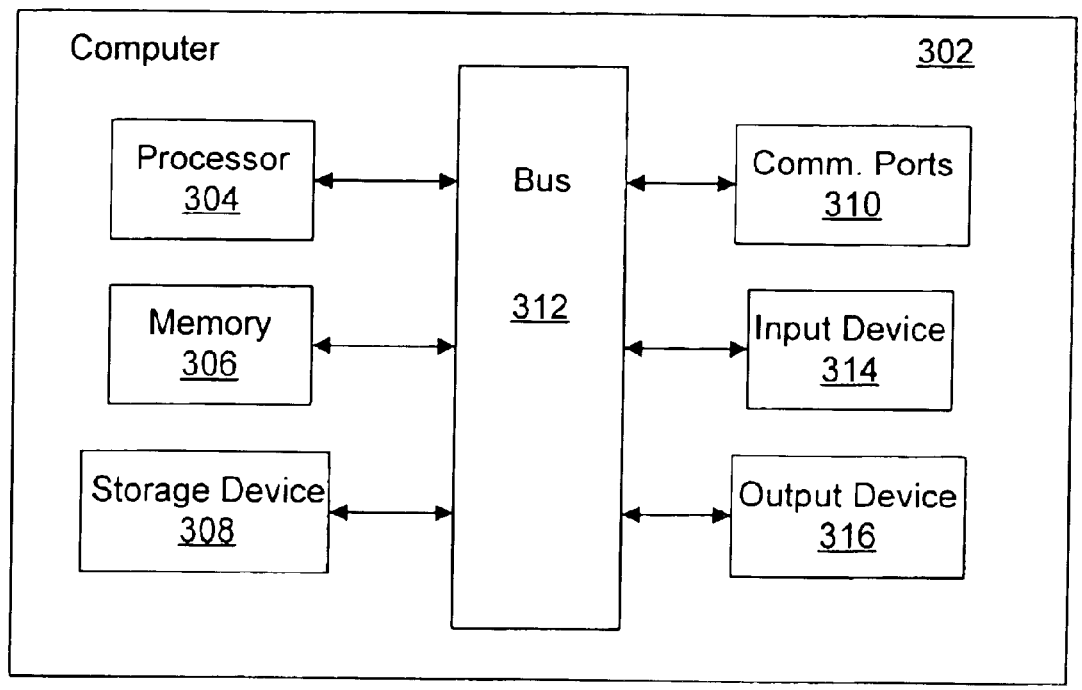
FIG. 3 is a block diagram of hardware components of an embodiment of a computer system.

FIG. 3 is a block diagram of hardware components of an embodiment of a computer system 302. Many different types of computer systems may be used to implement the computers 302 illustrated herein. The diagram of FIG. 3 illustrates typical components of a computer 302 including a processor 304, memory 306, a storage device 308, and one or more communication ports 310. A bus 312 electronically couples all of the components in the computer 302. Each of these components is known to those skilled in the art.

It will be appreciated by those skilled in the art that more components may be included in the computer 302. For example, several input devices 314 may be included, such as a keyboard, a mouse, a joystick, etc. In addition, several output devices 316 may be included such as a display screen, a printer, etc. Thus, those skilled in the art will appreciate that additional components may be added to the computer 302 without detracting from the functionality to serve as the computer 302.

The computer 302 may be a conventional desktop computer. Desktop computers are commercially available. However, it will be appreciated by those skilled in the art that the computer 302 is a broadly defined digital computer. A computer 302, as used herein, is any device that includes a digital processor capable of receiving and processing data. A computer 302 includes the broad range of digital computers including microcontrollers, hand-held computers, personal computers, servers, mainframes, supercomputers, and any variation or related device thereof. In current design, the computer 302 is typically an IBM-compatible personal computer running the Linux or Microsoft Windows operating system. Of course, other types of computers with different operating systems may be used. For example, an Apple computer or a UNIX workstation may be used as the computer 302.

Figure 4:
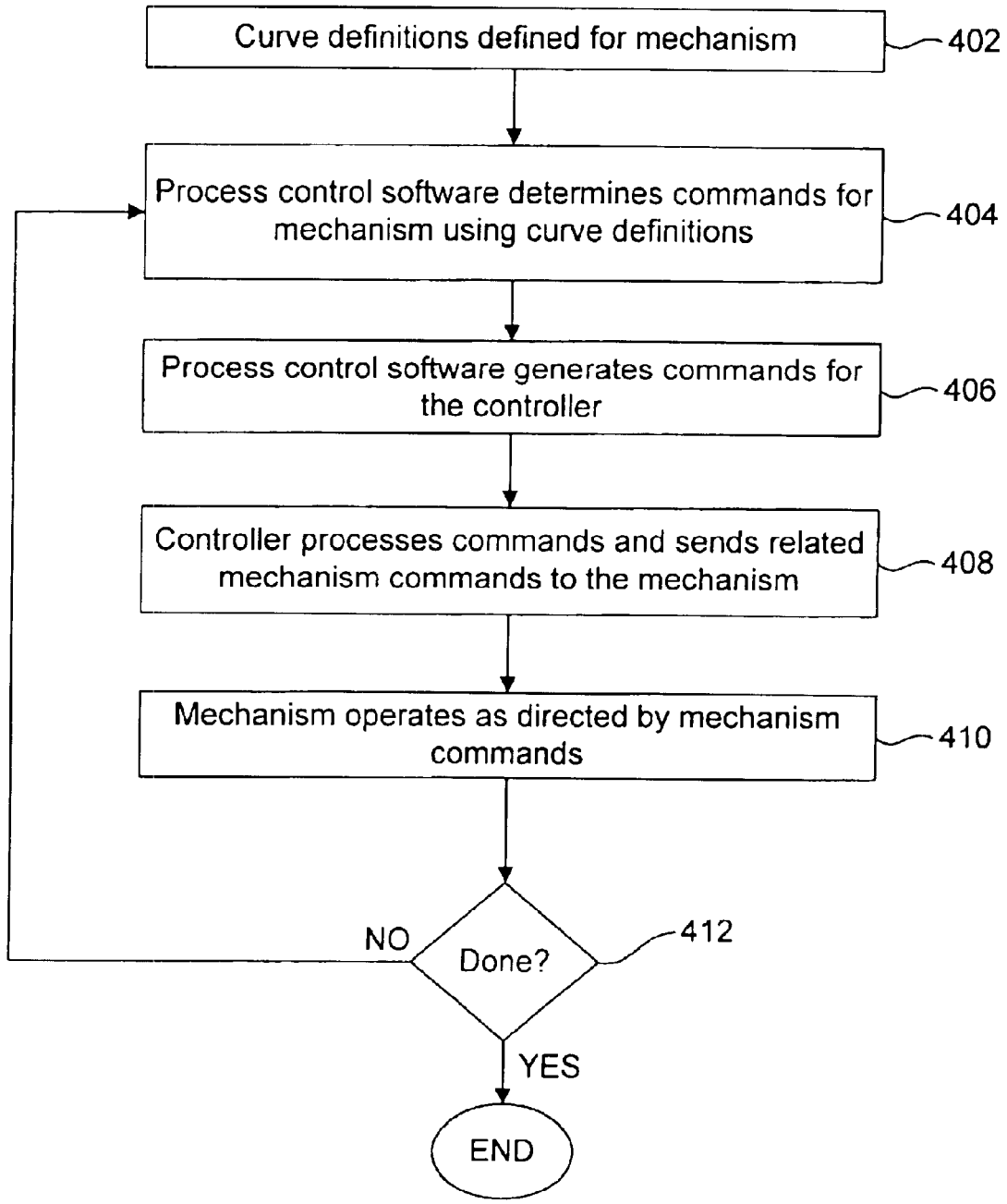
FIG. 4 is a flow diagram illustrating a method for using curve definitions for the control of an electronically-controlled mechanism.

FIG. 4 is a flow diagram illustrating a method for using curve definitions 114 for the control of an electronically-controlled mechanism 104. First, the curve definitions 114 are defined 402 for the targeted mechanism 104. Depending on what kind of tool, process, machine, etc., that is being controlled, the curve definition 114 will vary. The curve definitions 114 are used by the process control software 110 to determine 404 the commands to be sent to the controller 106 to control the mechanism 104.

The process control software 110 generates 406 commands for the controller 106. The controller 106 processes 408 the commands and sends related mechanism commands to the mechanism 104. The software controller 106 operates to translate the commands into mechanism commands. Mechanism commands are instructions that can be sent directly to the mechanism 104 and will is be understood by the mechanism 104. When the mechanism 104 receives the mechanism commands it operates as directed by the mechanism commands. If the process is complete 412, the method may end as shown. If further control is needed, the process control software 110 will again determine 404 the commands from the curve definition 114 and the steps as shown may be repeated.

Figure 5:
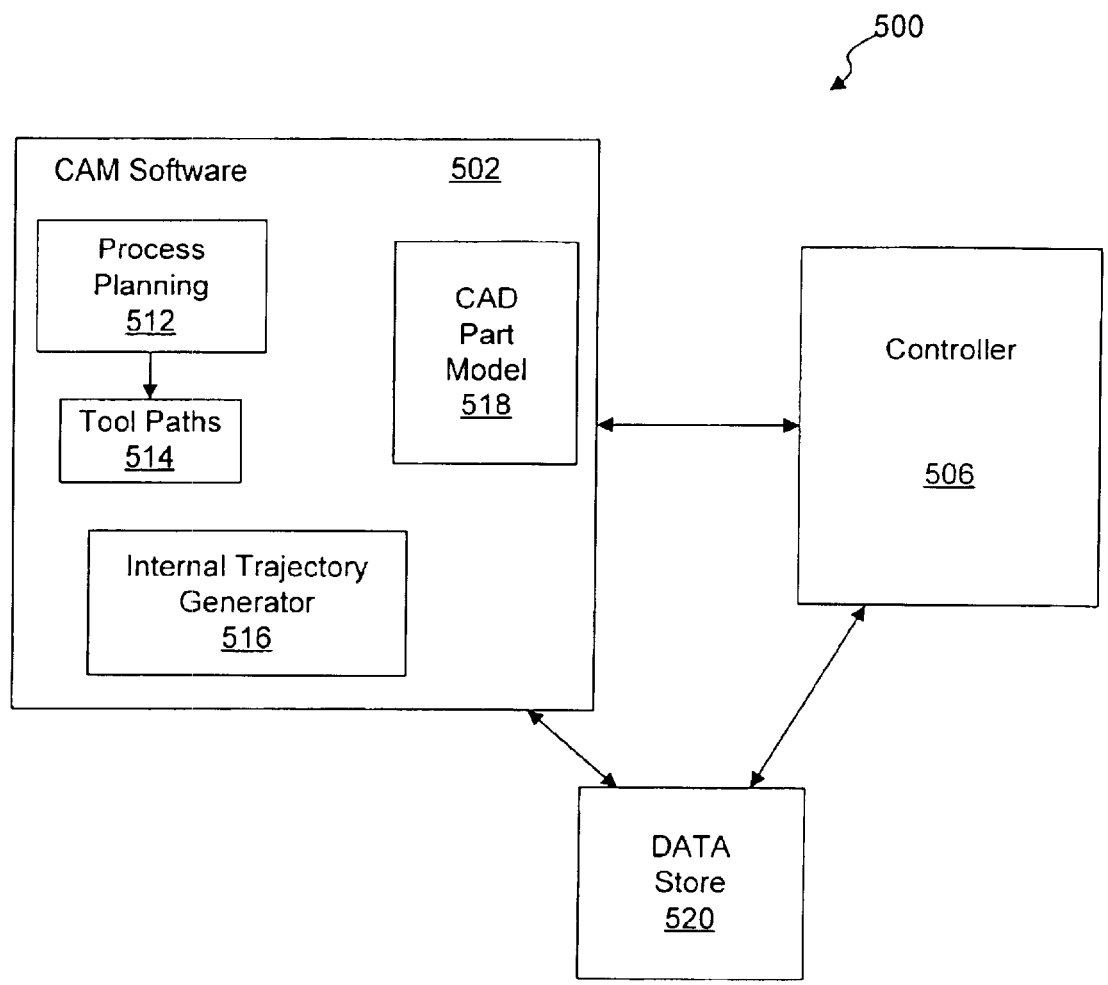
FIG. 5 is a general software block diagram of another system for controlling tool motion through the use of complex n-curves.

FIG. 5 is a general software block diagram of another system 500 for controlling tool motion through the use of complex n-curves. The software controller 506 controls the electronically-controlled mechanism 104 or tool through mechanism commands 108 sent to the mechanism 104. CAM (Computer-Aided Manufacturing) software 502 provides commands for the software controller 506 from which the controller 506 determines mechanism commands 108 to send to the mechanism 104.

The CAM software 502 includes process planning 512 that generates tool paths 514, as will be discussed below. An internal trajectory generator 516 is also included to generate data points for control of the mechanism 104. The CAM software 502 typically uses a Computer-Aided Design (CAD) part model 518. The CAM software 502 may communicate directly with the controller 506, or it 502 may store data in a data store 520. The controller 506 may access the data store 520 to store and/or retrieve different kinds of data or information, as disclosed herein.

A current and common class of n-curves (NURBS) will be used herein as an example of how the process control software 102 or CAM software 502 is a powerful and efficient control method. The term n-curve includes, but is not limited to, all existing formulations of algebraic, polynomial and parametric curves, e.g., subdivision, Bezier, Hermite, Gordon, B-splines, Splines, NURBS, etc. NURBS is used herein as an example to represent the general class of complex, parametrically described curves. The term curve connotes the mathematical representation of the variation of position, orientation (pose), or other parameters associated with a mechanism. A parametric n-curve is the mathematical representation of tool position, orientation (pose), and process parameters varying as a function of an extent parameter. The variable u is often used to represent this extent parameter.

Direct control of complex machine movements (e.g., the electronically-controlled mechanism 104) is defined as the use of algebraic and parametric n-curve path descriptions to control the motion of end-effectors and machine tools that are part of the mechanism 104 without need for conversion to intermediate programming languages or files. Instead of these intermediate programming languages or files, the process control software 110 sends commands directly to the software controller 106. The control of motion along parametric n-curves is not trivial because the path parameters do not linearly relate to path length such as in lines and circular arcs. Machining of, or movement along, these complex geometries is sometimes referred to as profile or contour machining/motion.

Figure 6:
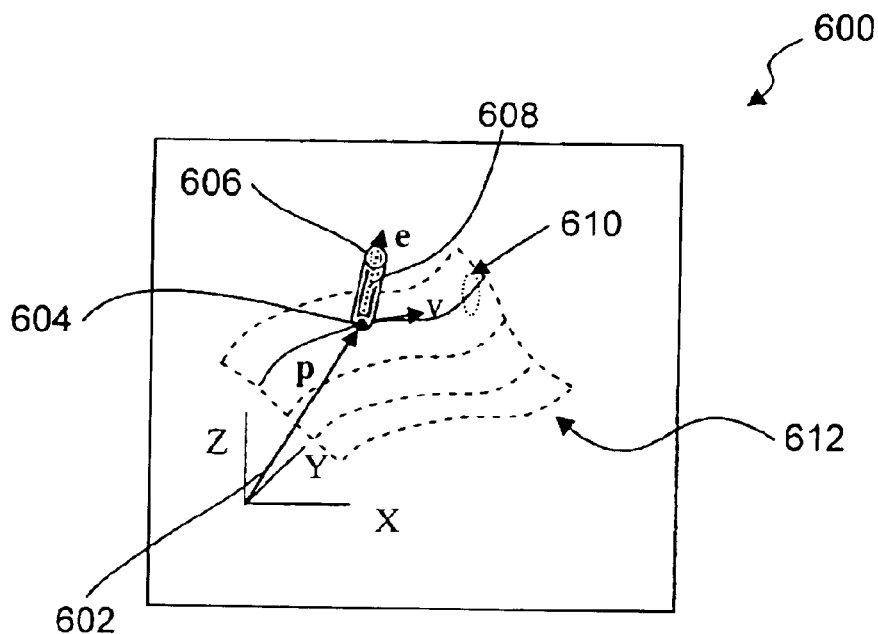
FIG. 6 is a three-dimensional graph showing a mechanism tool being moved along a complex curve on a complex surface.

FIG. 6 is a three-dimensional graph 600 showing a mechanism tool 606 being moved along a complex curve 610 on a complex surface 612. Several parameters are shown in the graph. A position vector p 602 locates a control point 604 on the tool 606. A unit vector e 608 orients the centerline of the tool 606. The speed v of the tool 606 along the curve 610 is also illustrated. The frame X-Y-Z serves as reference for the path parameters. Other parameters might be added to the list of the instantaneous path parameters. For example, if the tool 606 is being rotated, then the spindle rpm might be an additional parameter to be considered. Other examples include, but are not limited to, welding voltage, which may need to be varied along a part of varying thickness, the glue rate of a glue dispenser, and laser intensity and focal length.

For purposes of explanation, CAM process planning software 502 may be used as an embodiment of the process control software 110. However, it will be appreciated by those skilled in the art that any simulation software that relates workcell or part geometry to a manufacturing process may also be used with the inventive principles disclosed herein. The task planning activities currently used to plan a manufacturing process is indirect.

The typical CAM application 502 uses a Computer-Aided Design (CAD) part model 518, coupled with decomposition/intersection methods, to develop tool paths 514. These tool paths 514, along with settings such as feeds and speeds, process order commands, and signal (I/O) information, are used to generate the APT, CL, and M&G code representations of the process tasks that can be interpreted by conventional mechanism controllers 506. Referred to as post-processing, the process information and control sequence is stored in intermediate files that may be stored in the data store 520. The resident controller 506 uses these process files and ordered information to drive mechanisms 104 and ancillary equipment 104.

Figure 7:
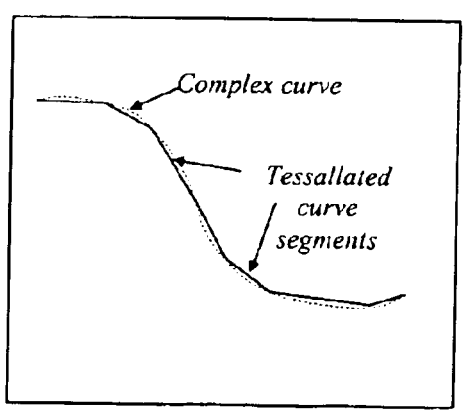
FIG. 7 is a graph of a tool path illustrating a tessellated sequence of small segmented linear or circular-arc (incremental) moves.

Presently, CAM process planning applications 502 take complex movements over a surface and decompose the tool path 514 into a tessellated sequence of small segmented linear or circular-arc (incremental) moves, as shown in FIG. 7. This approach is used because current controllers cannot act on the complex n-curve geometries directly within the CAD/CAM part model. The present mechanism controllers are limited in how complex geometries or curves are represented and the type of motion that the mechanism controller will support. As an example, machine tool programming typically uses M&G code programs to control the mechanism motion and other operational activities. The M&G code standard does not incorporate complex path representations such as n-curves into the standard. To avoid this limitation, some mechanism controller manufacturers have developed proprietary codes on top of the M&G code standard to represent the complex movements described by one type of n-curve, e.g. NURBS. The limitation in many controllers is that the incremental moves generated by the CAM pre-processor are then refitted into a NURBS mathematical representation. This is inefficient and generates geometrical errors.

The tessellated moves are usually described as a large sequence of small linear moves without concern for tool orientation when applying X-Y-Z (3-axis) mechanisms, or, when considering tool orientation, as a large number of closely spaced joint values when using 5 and 6-axis mechanisms. The effectiveness of motion depends on how fast the mechanism controller can process (or move through) the large number of closely spaced moves. This is one of the limiting factors to increasing the feed rate of a machine tool because there is a risk of being constrained by the block (move data) transfer rate.

Some of the more recent machine tool controllers accept some types of n-curves (e.g. NURBS) without the need for refitting, but this is also done through the use of intermediate programming languages or files and is not done in a direct control fashion. In addition, these more recent controllers limit the types of n-curves used to Cartesian curves. Orientation motions and other mechanism parameters are still described in tessellated form.

As used herein the term Cartesian curve refers to an n-curve of 3 or less dimensions that describes the positional motion of a mechanism in 3-dimensional (i.e. X-Y-Z) space. The term Cartesian curve does not refer to motions that deal with rotation or other mechanism control parameters. The term Cartesian deals with the position in 3-dimensional (i.e. X-Y-Z) space of an object or mechanism.

The embodiments disclosed herein may be used in dealing with the use of higher-dimensional n-curves in general control of mechanisms 104. The embodiments herein may also be used in dealing with the use of higher-dimensional curves in the direct control of mechanisms along n-curves, including higher-dimensional n-curves. It will be appreciated by those skilled in the art that the embodiments herein may also be applied in a variety of other contexts and implementations.

The following describes the application of dealing with the use of higher-dimensional n-curves in general control of mechanisms 104. The term higher-dimensional herein refers to the use of n-curves which may include, but are not limited to, definitions of: Cartesian motion, orientation motion, speed, feed rate, spindle speed, and other mechanism parameters such as welding voltage, glue rate, and laser intensity and focal length. The inventive principles disclose the use of higher-dimensional n-curves in the control of mechanisms generally and does not limit the embodiments to any particular mathematical, electronic, or physical construction or storage of higher-dimensional n-curves.

The use of higher-dimensional n-curves allows for the description of mechanism activity in position, orientation, and other mechanism parameters (such as welding voltage, the glue rate of a glue dispenser, and laser intensity and focal length) in terms of an n-curve. In this manner, any number or combination of position, orientation, joint values, and other mechanism control parameters may be combined into a single or multiple curve definition.

Higher-dimensional n-curves also allow for the control of mechanisms 104 in another non-traditional fashion. Using parametric Cartesian curves as an example, mechanism motion is typically specified by some speed or feed rate. The controller 106 then moves the mechanism 104 in a manner such as to maintain the speed of the mechanism 104 at the intended speed or feed rate. Non-traditional control of mechanisms 104 using higher-dimensional n-curves allows other parameters to be specified as the controlling parameter. As an example, if a glue gun is to follow a specific path and the amount of glue to be deposited at any one point varies but the flow rate of the glue is to be held constant, then the flow rate of the glue may be used as the controlling parameter. In this case, the speed of the mechanism 104 and all the other parameters will be a function of the glue rate.

Higher-dimensional n-curves also allow for the coordinated control of multiple mechanisms 104. In this case, the motion and/or activity of two or more separate and/or combined mechanisms 104 may be controlled in a coordinated fashion by combining their respective motions and/or control parameters into a single or multiple higher-dimensional n-curve.

As mentioned above, the embodiments herein may also be used in dealing with the use of higher-dimensional curves in the direct control of mechanisms 104 along n-curves, including higher-dimensional n-curves. The following describes the application of using higher-dimensional curves in the direct control of mechanisms 104 along n-curves.

This method is based on a concept of direct control whereby the CAM 502 or other process control software 110 resides either on the same computer 102 as the controller software (e.g., motion planning and servo control software) or is connected to the control computer 203 by a network, including wireless. These different configurations are illustrated in FIGS. 1 and 2. One difference in this method is that the CAM process 502, or the process generated by other process control software 110 can be directly acted on by a software-based controller without need for post-processing the commands into intermediate files and controller programming languages.

Figure 8:
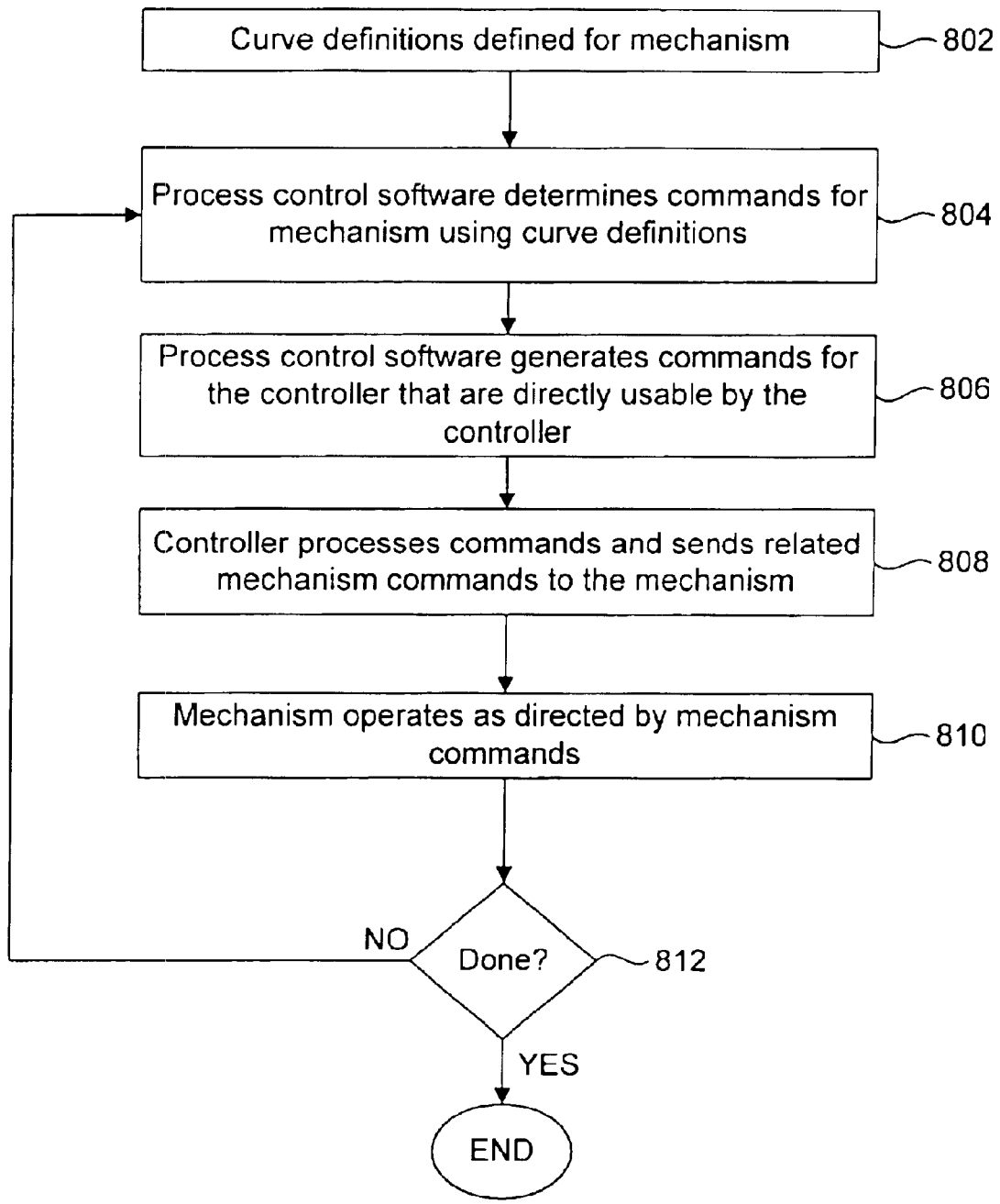
FIG. 8 is a flow diagram illustrating a method for using curve definitions for the direct control of an electronically-controlled mechanism.

FIG. 8 is a flow diagram illustrating a method for using curve definitions for the direct control of an electronically-controlled mechanism 104 along n-curves. First, the curve definitions are defined 802 for the targeted mechanism. Depending on what kind of tool, process, machine, etc., that is being controlled, the curve definition will vary. The curve definitions are used by the process control software 110 to determine 804 the commands to be sent to the controller 106 to control the mechanism 104.

The process control software 110 generates 806 commands for the controller 106 that are directly usable by the controller 106. The commands for the controller 106 are directly usable by the controller 106 in that the commands do not have to be processed before they can be used by the controller. The controller 106 processes 808 the commands and sends related mechanism commands to the mechanism 104. The controller 106 operates to translate the commands into mechanism commands. Mechanism commands are instructions that can be sent directly to the mechanism 104 (e.g., tool, equipment, etc.) and will be understood by the mechanism 104. When the mechanism 104 receives the mechanism commands it operates as directed by the mechanism commands. If the process is done, the method as shown may end. If further control is needed, the process control software 110 will again determine the commands from the curve definition and the steps as shown may be repeated.

Under the direct control method, motion planning software will directly process the complex n-curve representations in the CAM application 502 without the need for tessellation of complex n-curves such as NURBS into lower order forms such as lines and arcs. A software-based internal trajectory generator 516 moves the mechanism 104 along the n-curve at some trajectory rate, generating the joint set points used to close the software-based servo control loops.

Figure 9:
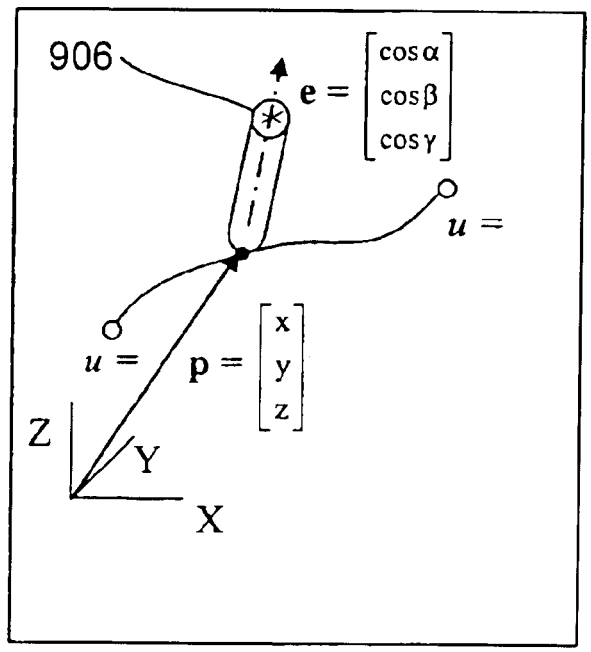
FIG. 9 illustrates that Cartesian parametric n-curves typically relate position along the curve to some curve parameter that describes the boundaries or extent of the curve.

Cartesian parametric n-curves typically relate position along the curve to some curve parameter that describes the boundaries or extent of the curve, as shown in FIG. 9. The position is often represented by a position vector of size three for X-Y-Z coordinates of a tool 906 reference point as it varies as a function of the n-curve parameter value. This representation does not describe tool pose (position and orientation) for mechanisms that have more joints than three, some of which have orientation joints to orient the tool uniquely along the curve. Examples are 5-axis machine tools with X, Y, Z, A and B axes, 6-axis robots having six revolute joints, etc.

Figure 10:
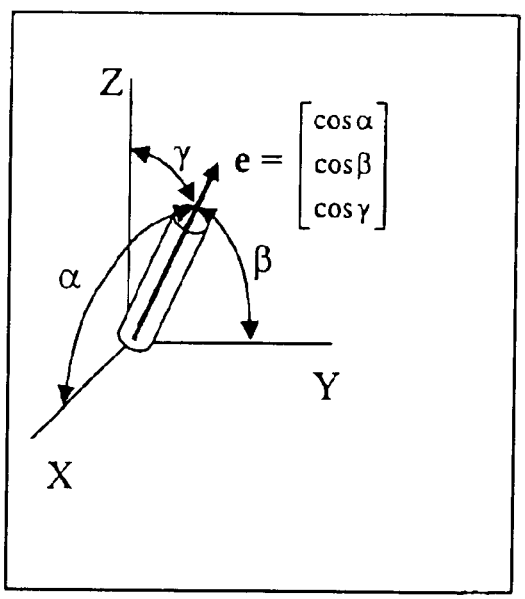
FIG. 10 illustrates that the control of tool motion often requires that both tool position and tool orientation be varied according to constraints that relate to process.

Higher-dimensional n-curves provide the optimal formulation for controlling machines having more than one axis and any number of process control parameters. For example, the control of tool motion often requires that both tool position and tool orientation be varied according to constraints that relate to process, e.g., a welding pitch angle, as shown in FIG. 10. This system includes direct control of complex tool pose (position and orientation) along complex curves that can be represented in one of two methods described as follows. In addition, the method also allows for other control parameters such as tool feed rate or spindle rpm to expand the control vectors described in the two following methods, thus extending a 5- or 6-dimensional curve to a 7- or 8- or even n-dimensional curve.

Tool pose can be expressed in several ways. Position would be expressed in terms of three coordinates (X, Y, Z), whereas orientation could be expressed by a set of angles or, for axisymmetric tools, as a set of direction cosines. A direction cosine is the cosine of an orientation angle. The pose could then be represented generally as one or more control point vector equations used in complex n-curve formulations by combining the position coordinates and the orientation parameters. Again, these vector equations could be expanded to include additional control parameters, such as feed rate (path speed), spindle rpm, welding voltage, etc., that might vary along the path according to some planning algorithm used in the CAM application 502 or other process planning software 110.

The first method for representing a complex curve is to use one complex n-curve, such as a NURBS, Bezier, Hermite, etc. This n-curve uses an n-dimensional vector to represent position, orientation, and process control parameters. Although specified as n-dimensional when applied, n will be chosen as a number representing the number of dimensions being simultaneously controlled. This depends on mechanism type or process. The vector combines the position coordinates and the orientation parameters (angle or direction cosines) into a pose vector. This vector can also include additional process control parameters such as feed rate and spindle rpm, or perhaps even a signal value to fire some output to a sensor or activate some device at some point along the complex curve. For example, a 5-axis machine tool would typically use three position coordinates and only two orientation angles to describe tool pose as a function of movement along the complex curve. Fewer parameters might be used if a particular process requires that a subset of the mechanism joints be used during the duration of the process. An example is where the tool orientation is to be held fixed during the next movement sequence.

The n-dimensional curve is generated in the CAM application 502 by the process planning software 512 that generates tool paths 514 as a function of process constraints. No limitation is applied to the method used to generate this n-dimensional curve. Each point along the n-curve represents a unique tool pose vector (position and orientation), limited by the extent (or boundary) of the curve defined by the extent parameter, expanded by other control parameters as needed. In addition to the extent parameter, typical curve parameters are the control points and knot vectors that uniquely represent the shape of this curve in n-dimensional space, including the variation of other control parameters such as feedrate and spindle rpm as we move along the complex n-curve.

Figure 11:
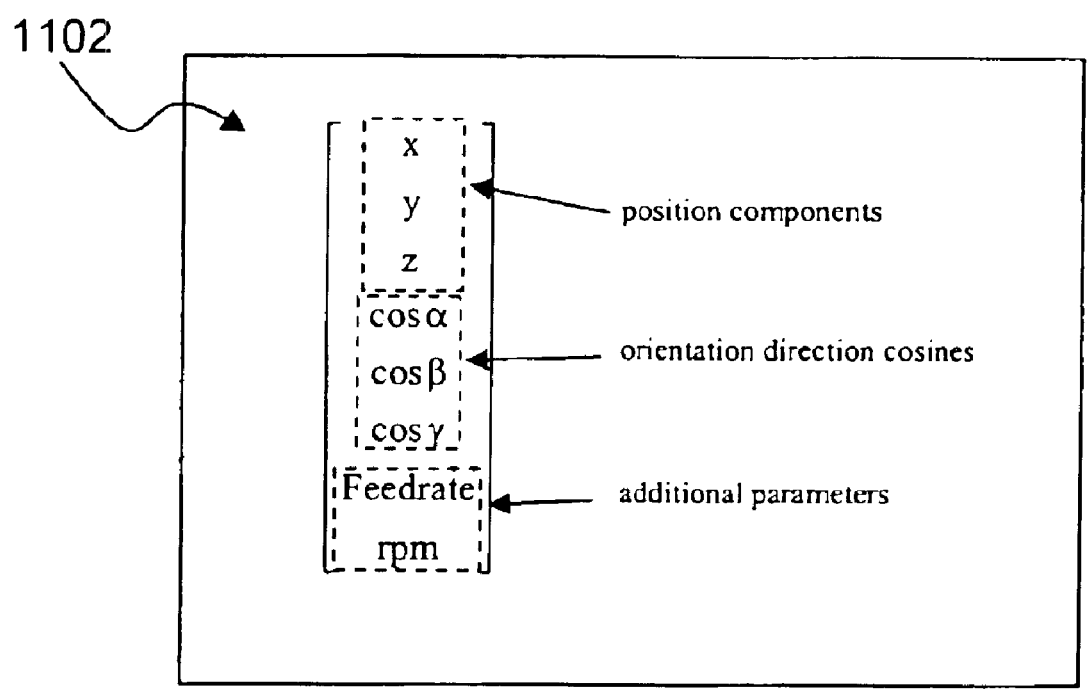
FIG. 11 shows that path and motion control parameters may be collected into an n-dimensional control point vector.

Mathematically, we can collect the important path and motion control parameters into an n-dimensional control point vector 1102 shown in FIG. 11. In this example we have included eight parameters for tool pose, tool feedrate and spindle rpm, but more could be included. A NURBS n-dimensional curve would use this vector representation to represent the variation of all 8 parameters as a function of extent parameter along the curve from the starting extent parameter to the ending extent parameter value. Although the orientation is represented by the three direction cosines, there are other representations of orientation that could be used in place of this representation form. For example, the n-curve control vector in FIG. 11 could pass the angles $\alpha, \beta,$ and $\gamma$ instead, rather than their cosine values.

It is necessary for the motion planning and servo control software to process the single curve for tool pose as a function of the extent parameter, and also change the feedrate and spindle rpm and other control parameters if they vary along the move. This will generate the set points for all mechanism axes involved in posing the tool correctly as the mechanism moves along the curve in space.

The following is another method for representing direct control of complex tool pose along complex curves. This method uses any combination of complex n-curve mathematical representations, such as NURBS, to represent the tool pose. For example, one NURBS (or Bezier, Splines, algebraic or polynomial in any combination) may be used to represent tool position using an X-Y-Z control point vectors, and two additional NURBS may be used to represent tool orientation, one for the A axis, one for the B axis. Another representation may replace orientation angles with direction cosines of a tool orientation vector. Typical parameters are the control points and knot vectors that uniquely represent the shape of the mathematical n-curve. In addition, the variation of these parameters along the n-curve is expressed in terms of an extent parameter that defines the boundary (starting and ending) of the curve.

Similarly, other n-curve combinations can be used to represent a subset of the six parameter pose vector (three position coordinates, three orientation angles or direction cosines). The combination of n-curves and dimensional representation of each individual n-curve will add up to, at most, the six dimensions required to pose the tool.

Additional n-curves could be used to represent other control parameters, such as feedrate and spindle rpm, as they vary along the path described by the path position and orientation n-curves.

An inefficient method may use a single n-curve for each dimension of the general pose vector. Fewer dimensions and thus fewer n-curves would be required for mechanisms with less than six joints or for tasks that require fewer dimensions. Simpler mechanisms limit the dimensionality of the tool pose.

These mathematical representations are generated in the CAM application 502 by process planning software 512 that generates tool paths 514 as a function of process constraints. No limitation is applied to the method used to generate these curves; only, that they be related by parameter extent.

In summary, both methods one and two use one or more n-curves (or other complex curve representations), each having dimension n or less, depending on mechanism type. These complex curves relate their extent parameters in a one-to-one relationship.

It is necessary for the motion planning and servo control software to process all n-curves simultaneously for tool pose as a function of the same extent parameter. This will generate the set points for all the mechanism axes involved in posing the tool correctly.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for controlling a mechanism through the use of higher-dimensional n-curves, comprising:
   providing an electronically-controlled mechanism;
   establishing electronic communication by a computer with the electronically-controlled mechanism;
   executing a controller on the computer to send mechanism commands to the electronically-controlled mechanism; and
   executing process control software to control the electronically-controlled mechanism, wherein the process control software uses a higher-dimensional n-curve to control the electronically-controlled mechanism, wherein the higher-dimensional n-curve comprises a representation of the variation of a plurality of parameters associated with the electronically-controlled mechanism, and wherein the variation of the plurality of parameters is expressed in terms of an extent parameter that defines a boundary of the curve.

2. The method of claim 1, wherein the higher-dimensional n-curve describes mechanism position.

3. The method of claim 1, wherein the higher-dimensional n-curve describes mechanism orientation.

4. The method of claim 1, wherein the higher-dimensional n-curve describes welding voltage.

5. The method of claim 1, wherein the higher-dimensional n-curve describes glue rate.

6. The method of claim 1, wherein the higher-dimensional n-curve describes laser intensity.

7. The method of claim 1, wherein the higher-dimensional n-curve describes focal length.

8. The method of claim 1, wherein the higher-dimensional n-curve describes spindle speed.

9. The method of claim 1, wherein the higher-dimensional n-curve describes feed rate.

10. The method of claim 1, wherein the higher-dimensional n-curve describes Cartesian motion.

11. The method of claim 1, wherein the higher-dimensional n-curve describes orientation motion.

12. The method of claim 1, wherein the higher-dimensional n-curve describes speed.

13. The method of claim 1, wherein the higher-dimensional n-curve include subdivision, B-spline, non-uniform rational B-spline and Bezier mathematics.

14. The method of claim 1, wherein the electronically-controlled mechanism comprises a tool.

15. A method for direct control of a mechanism through the use of higher-dimensional n-curves, comprising:
providing an electronically-controlled mechanism;
establishing electronic communication by a computer with the electronically-controlled mechanism;
executing a controller on the computer to send mechanism commands to the electronically-controlled mechanism; and
executing process control software to control the electronically-controlled mechanism, wherein the process control software uses a higher-dimensional n-curve to control the electronically-controlled mechanism, wherein the higher-dimensional n-curve comprises a representation of the variation of a plurality of parameters associated with the electronically-controlled mechanism, wherein the variation of the plurality of nanometers is expressed in terms of an extent parameter that defines a boundary of the curve, and wherein the process control software generates commands that are directly usable by the controller.

16. The method of claim 15, wherein the higher-dimensional n-curve describes mechanism position.

17. The method of claim 15, wherein the higher-dimensional n-curve describes mechanism orientation.

18. The method of claim 15, wherein the higher-dimensional n-curve describes welding voltage.

19. The method of claim 15, wherein the higher-dimensional n-curve describes glue rate.

20. The method of claim 15, wherein the higher-dimensional n-curve describes laser intensity.

21. The method of claim 15, wherein the higher-dimensional n-curve describes focal length.

22. The method of claim 15, wherein the higher-dimensional n-curve describes spindle speed.

23. The method of claim 15, wherein the higher-dimensional n-curve describes feed rate.

24. The method of claim 15, wherein the higher-dimensional n-curve describes Cartesian motion.

25. The method of claim 15, wherein the higher-dimensional n-curve describes orientation motion.

26. The method of claim 15, wherein the higher-dimensional n-curve describes speed.

27. The method of claim 15, wherein the higher-dimensional n-curve include subdivision, B-spline, non-uniform rational B-spline and Bezier mathematics.

28. The method of claim 15, wherein the electronically-controlled mechanism comprises a tool.

29. The method of claim 15, wherein the process control software uses one complex n-curve.

30. The method of claim 15, wherein the process control software uses any combination of complex n-curves.

31. A system for controlling a mechanism through the use of higher-dimensional n-curves, comprising:
an electronically controlled mechanism;
a computer in electronic communication with the electronically-controlled mechanism,
the computer comprising:
a processor;
memory in electronic communication with the processor;
process control software to control the electronically-controlled mechanism,
wherein the process control software uses a higher-dimensional n-curve to control the electronically-controlled mechanism, wherein the higher-dimensional n-curve comprises a representation of the variation of a plurality of parameters associated with the electronically-controlled mechanism, and wherein the variation of the plurality of parameters is expressed in terms of an extent parameter that defines a boundary of the curve.

32. The system of claim 31, wherein the higher-dimensional n-curve describes mechanism position.

33. The system of claim 31, wherein the higher-dimensional n-curve describes mechanism orientation.

34. The system of claim 31, wherein the higher-dimensional n-curve describes welding voltage.

35. The system of claim 31, wherein the higher-dimensional n-curve describes glue rate.

36. The system of claim 31, wherein the higher-dimensional n-curve describes laser intensity.

37. The system of claim 31, wherein the higher-dimensional n-curve describes focal length.

38. The system of claim 31, wherein the higher-dimensional n-curve describes spindle speed.

39. The system of claim 31, wherein the higher-dimensional n-curve describes feed rate.

40. The system of claim 31, wherein the higher-dimensional n-curve describes Cartesian motion.

41. The system of claim 31, wherein the higher-dimensional n-curve describes orientation motion.

42. The system of claim 31, wherein the higher-dimensional n-curve describes speed.

43. The system of claim 31, wherein the higher-dimensional n-curve include subdivision, B-spline, non-uniform rational B-spline and Bezier mathematics.

44. The system of claim 31, wherein the electronically-controlled mechanism comprises a tool.

45. A system for direct control of a mechanism through the use of higher-dimensional n-curves, comprising:
an electronically controlled mechanism;
a computer in electronic communication with the electronically-controlled mechanism,
the computer comprising:
a processor;
memory in electronic communication with the processor;
process control software to control the electronically-controlled mechanism,
wherein the process control software uses a higher-dimensional n-curve to control the electronically-controlled mechanism, wherein the higher-dimensional n-curve comprises a representation of the variation of a plurality of parameters associated with the electronically-controlled mechanism, wherein the variation of the naturality of parameters is expressed in terms of an extent parameter that defines a boundary of the curve, and wherein the process control software generates commands that are directly usable by the controller.

46. The system of claim 45, wherein the higher-dimensional n-curve describes mechanism position.

47. The system of claim 45, wherein the higher-dimensional n-curve describes mechanism orientation.

48. The system of claim 45, wherein the higher-dimensional n-curve describes welding voltage.

49. The system of claim 45, wherein the higher-dimensional n-curve describes glue rate.

50. The system of claim 45, wherein the higher-dimensional n-curve describes laser intensity.

51. The system of claim 45, wherein the higher-dimensional n-curve describes focal length.

52. The system of claim 45, wherein the higher-dimensional n-curve describes spindle speed.

53. The system of claim 45, wherein the higher-dimensional n-curve describes feed rate.

54. The system of claim 45, wherein the higher-dimensional n-curve describes Cartesian motion.

55. The system of claim 45, wherein the higher-dimensional n-curve describes orientation motion.

56. The system of claim 45, wherein the higher-dimensional n-curve describes speed.

57. The system of claim 45, wherein the higher-dimensional n-curve include subdivision, B-spline, non-uniform rational B-spline and Bezier mathematics.

58. The system of claim 45, wherein the electronically-controlled mechanism comprises a tool.

59. The system of claim 45, wherein the process control software uses one complex n-curve.

60. The system of claim 45, wherein the process control software uses any combination of complex n-curves.

* * * * *

UNITED STATES PATENT AND TRADEMARK OFFICE
CERTIFICATE OF CORRECTION

PATENT NO. : 6,895,299 B2  
DATED : May 17, 2005  
INVENTOR(S) : Red et al.

It is certified that error appears in the above-identified patent and that said Letters Patent is hereby corrected as shown below:

Column 4,
Line 58, please delete "will is be" and replace with -- will be --.

Column 11,
Line 52, please delete "nanometers" and replace with -- parameters --.

Column 13,
Line 18, please delete "naturality" and replace with -- plurality --.

Signed and Sealed this

Eighth Day of November, 2005

JON W. DUDAS  
*Director of the United States Patent and Trademark Office*